US007025297B2

(12) United States Patent
Bell et al.

(10) Patent No.: US 7,025,297 B2
(45) Date of Patent: Apr. 11, 2006

(54) SEAT BELT RETRACTOR

(75) Inventors: John Bell, Carlisle (GB); Brian A. Jack, Annan (GB); Martyn Palliser, Carlisle (GB)

(73) Assignee: Key Safety Systems, Inc., Sterling Heights, MI (US)

( * ) Notice: Subject to any disclaimer, the term of this patent is extended or adjusted under 35 U.S.C. 154(b) by 39 days.

(21) Appl. No.: 10/876,354

(22) Filed: Jun. 25, 2004

(65) Prior Publication Data

US 2005/0139711 A1 Jun. 30, 2005

(30) Foreign Application Priority Data

Dec. 30, 2003 (EP) ................................. 03258230

(51) Int. Cl.
*B60R 22/36* (2006.01)

(52) U.S. Cl. .................................... 242/384; 242/379.1

(58) Field of Classification Search ............. 242/379.1, 242/382, 384; 280/805, 806, 807; 297/470, 297/471, 472, 476, 477, 478

See application file for complete search history.

(56) References Cited

U.S. PATENT DOCUMENTS 5,558,295 A * 9/1996 Bauer ...................... 242/379.1
5,611,498 A * 3/1997 Miller et al. ............. 242/379.1
5,788,177 A * 8/1998 Keller et al. ............. 242/379.1
5,799,893 A * 9/1998 Miller et al. ............. 242/379.1
5,961,060 A * 10/1999 Brambilla et al. ....... 242/379.1
5,967,442 A 10/1999 Wier
6,216,972 B1 * 4/2001 Rohrle .................... 242/379.1
6,564,895 B1 * 5/2003 Bohmler ..................... 180/269
6,598,904 B1 * 7/2003 Nagata et al. .............. 280/807
2001/0050474 A1 12/2001 Sumiyashiki et al.
2003/0141398 A1 7/2003 Aihara et al.
2003/0192976 A1 10/2003 Bell et al.

* cited by examiner

*Primary Examiner*—Kathy Matecki
*Assistant Examiner*—Scott Haugland
(74) *Attorney, Agent, or Firm*—Lonnie Drayer

(57) ABSTRACT

A seat belt retractor has a spool mounted for rotation on the retractor, for retraction or payout of seat-belt webbing depending upon the rotation direction of the spool. The spool is locked against rotation when a crash condition is sensed. A force limiter allows further payout of the seat belt webbing after the spool shaft has locked, under the influence of a vehicle occupant's forward momentum. The force limiter has a first resilient component attached in the force path between the spool and the locking component. A second resilient component is a wire releasably held in the force path between the spool and the locking component by a locking plate engaged with the locking component. The wire is released from the force path by disengagement between the locking plate and the locking component.

6 Claims, 3 Drawing Sheets

SEAT BELT RETRACTOR

FIELD OF THE INVENTION

The present invention relates to a retractor for a vehicle seat belt.

BACKGROUND OF THE INVENTION

A retractor has a cylindrical spool. Seat belt webbing is attached to and wound around the spool and the spool is mounted on a spool shaft in the retractor to be rotatable. Webbing is wound onto the spool under action of a retractor spring and is paid out under the influence of relatively gentle forwardly directed movement of a vehicle occupant, for example to allow for normal movement associated with vehicle occupancy such as reaching forwards to activate in-car controls (for a radio or a window) or to reach a glove compartment or door pocket. In the event of a crash, the more extreme momentum of the vehicle occupant activates a crash sensor which locks the spool against rotation and thus prevents forward motion of the vehicle occupant and injury due to the vehicle occupant colliding with the interior fixtures of the vehicle such as the steering wheel, dashboard or windscreen.

One known approach is to interpose a deformable member such as steel torsion bar in the force path between the locking mechanism and the spool. Under application of a high torque a torsion bar can rotate up to 7 or 8 times whilst still remaining intact and thereby allow pay-out of webbing generally in proportion to the momentum of the vehicle occupant at the moment of a crash condition being sensed. It thus reduces the injurious effects of the seat belt in a crash. The load limiting effect provided by such retractors is reliant upon the material properties of the deformable member and so only one predefined level of load limiting can be achieved for a given crash.

The forces exerted on a vehicle occupant during a crash vary. There are higher forces during the initial moments of the crash and the force decreases with time. Thus two-stage load limiting retractors have been suggested. These typically include a combination of two deformable elements arranged such that one deformable element provides continuous load limiting and the second element is engaged at a predetermined point in time to temporarily provide a higher level of load limiting.

Known retractors provide load limiting but do not allow for adjustment to suit different vehicle occupants and crash criteria in situ. The weight and size of a vehicle occupant and the crash severity affects the performance of such load limiters. It would be an advantage to have a retractor that can offer load limiting to suit such variables more closely.

SUMMARY OF THE INVENTION

According to the present invention there is provided a seat belt retractor comprising: a spool mounted for rotation to allow retraction or pay-out of seat-belt webbing wound thereon depending upon the rotation direction of the spool; a locking ring connected to the spool for rotation therewith; a locking plate connected to the spool for rotation therewith; a lock bar activated by a crash sensor to engage the locking ring to prevent rotation when a crash condition is sensed; first and second force limiting means for controlling pay-out of the seat belt webbing after the locking ring has been locked against rotation; the first force limiting means comprising resilient means having one end connected to the locking ring and the other end connected to the spool in the force path between the spool and the lock bar; the second force limiting means comprising a wire having one end located in a recess in the spool and the other end connected to the locking plate; and means for selectively connecting the locking plate to the lockbar such that when the locking plate is secured against rotation the second force limiting means is activated.

The invention makes possible adaptive load limiting by enabling the selection of two different restraining levels during a crash. This arrangement is particularly advantageous because it can provide suitable restraining levels for at least three broad categories of vehicle occupants, for example small, medium or large vehicle occupants. A smaller vehicle occupant is likely to require only the first resilient means to provide appropriate load limiting throughout the duration of a crash. A large vehicle occupant is likely to require a higher level of load limiting as provided by the combination of both the torsion bar and the wire of the present invention. In the earlier stages of a crash, where the forces exerted on the vehicle occupant tend to be highest, a medium sized vehicle occupant is likely to require the higher level of load limiting but later in the crash, the lower level may be more appropriate. Switching from a high to a low restraining level would be especially beneficial if timed to coincide with a vehicle occupant's engagement with an airbag and would allow the restraining force exerted on the vehicle occupant to be more appropriately shared between both the airbag and the seat belt webbing, reducing the impact on any one area of the body of the vehicle occupant.

In combining the criteria of vehicle occupant size or weight with that of crash severity and vehicle occupant position, The retractor of the present invention can provide suitable load limiting for a broad range of crash scenarios. A vehicle occupant sitting relatively far from an airbag may be better protected if the retractor steps down to provide a lower restraining force to pay out enough webbing to enable correct engagement with an airbag, whilst the same vehicle occupant sitting close to an airbag during a crash may require the higher level of restraint.

DETAILED DESCRIPTION OF THE INVENTION

The present invention may be employed with a traditional seat belt retractor that is well known to a person skilled in the art. Such a retractor typically has a cylindrical retractor spool mounted for rotation in a frame for winding in and paying-out seat belt webbing. In a crash, a sensor activates a locking mechanism to move a lockbar to engage teeth on a locking ring that is fixed to one end of the spool. Subject to further movement due to load limiting arrangements the spool is then locked against further rotation. The other end of the spool is connected to a rewind spring mechanism that comprises a clock type coiled spring that biases the spool to a webbing rewound condition.

Figure 1:
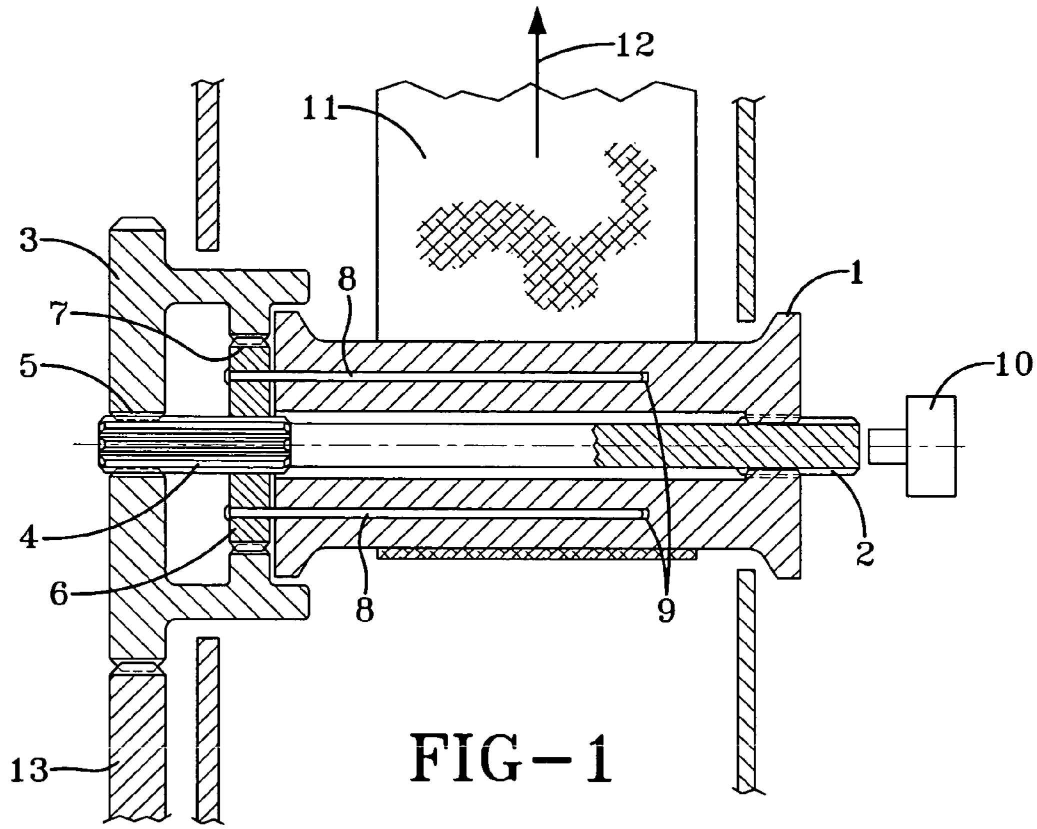
FIG. 1 is a side view of a section taken along the axis of the spool of a first embodiment prior to a crash.

FIG. 1 shows a spool 1 in cross section with a load limiting torsion bar 2 mounted along the axis of the spool and fixed at one end to a locking ring 3 by engagement of splines 4 in a correspondingly shaped hole 5 in the locking ring 3. A locking plate 6 is mounted at the same end of the torsion bar 2 and is disposed around the torsion bar 2. Teeth 7 are formed around an outer circumferential surface of the locking plate 6 so as to engage corresponding teeth formations on an inner surface of the locking ring 3. Wires 8 are housed in a recess 9 along the length of the spool and are releasably engaged at one end in holes in the locking plate 6. The force limiting means is primed with the wire held in the force path between the spool and the locking mechanism prior to a crash condition.

Webbing 11 is wound on the spool and unwound in the direction of arrow 12.

A pyrotechnic device 10 is arranged for operation at the other end of the torsion bar 2, connected to the spool 1 at the side of the retractor at which the rewind spring is attached to the spool 1.

A crash sensor detects a crash by the sudden deceleration which occurs and causes a load bearing lockbar 13 to engage the locking ring 3 and thus to lock the spool against further rotation. However, if the crash force is above a predetermined value then the force on the torsion bar 2 will cause it to twist and the spool 1 will rotate relative to the locking ring 3 under conditions controlled by the torsion bar 2, paying out a small amount of webbing 11 until the crash forces have dissipated. The torsion bar 2 thus acts as a first load limiting mechanism.

The wire 8 forms a second load limiting mechanism when it is connected between the spool 1 and the locking plate 6. The locking plate 6 is initially engaged with the locking ring 3 and, as the torsion bar 2 twists relative to the locking ring 3, the wires 8 are gradually drawn out of the recesses 9 in the spool 1. The combination of the torsion bar 2 and the wires 8 raises the load limiting threshold giving a higher combined level of load limiting than the torsion bar 2 on its own.

Figure 2:
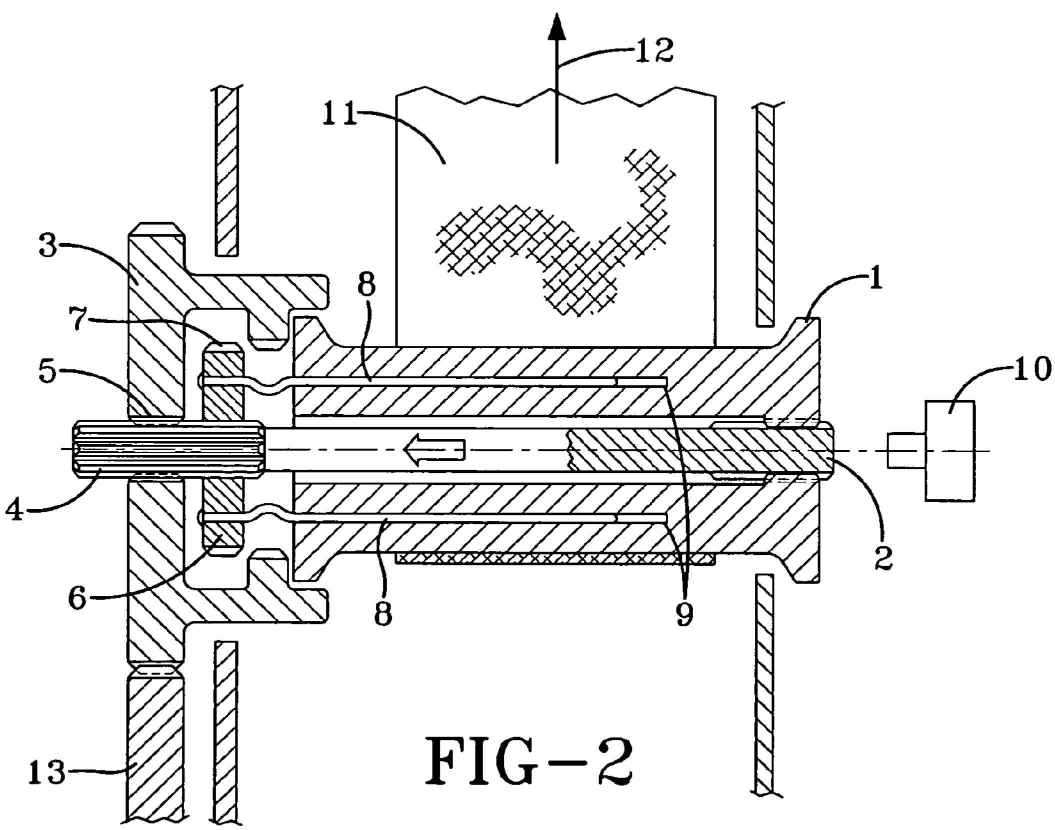
FIG. 2 is a side view of a section taken along the axis of the spool of a first embodiment prior to a crash after disengagement of the wire.

A sensor (not shown) continually senses values of vehicle occupant weight, size, position and crash severity and these values are compared to predetermined values in order to weather the desired level of load limiting which is required for example whether the torsion bar 2 alone or a combination of the torsion bar 2 and the wires 8 is preferable. A control signal is issued if the combined level of load limiting is not required, for example in the event of a less severe crash, which causes the pyrotechnic device 10 to fire and move the locking plate 6 to the left in the figure to the position shown in FIG. 2, thereby disconnecting the locking plate 6 from the wire 8 and the locking ring 3. With the locking plate 6 disconnected the wires 8 are no longer held in the force path between the spool 1 and the locking ring 3 and a lower level of load limiting is provided by the torsion bar 2 alone.

Advantageously the resilient wire may be selectively released from the force path at a predetermined time during a crash, preferably under control of a control signal. The control signal may be supplied in dependence upon a value of at least one of the weight, size and position of the vehicle occupant and/or the severity of the crash. The control signal may be supplied if the sensed value is below a predetermined value.

The pyrotechnic device may act on the torsion bar 2, moving the locking plate 6 axially by the required amount or may alternatively push the locking plate 6 directly.

According to a further embodiment the locking mechanism comprises at least one lockbar 13*a*, 13*b* engaging each of the locking plate and locking ring such that the at least one lockbar in engagement with the locking plate may be disengaged, allowing the locking plate to rotate with the spool, thereby releasing the wire from the force path. Put another way, the locking plate is engaged with a locking ring and may be selectively disengaged from the locking ring by means for translating the locking plate.

Figure 3:
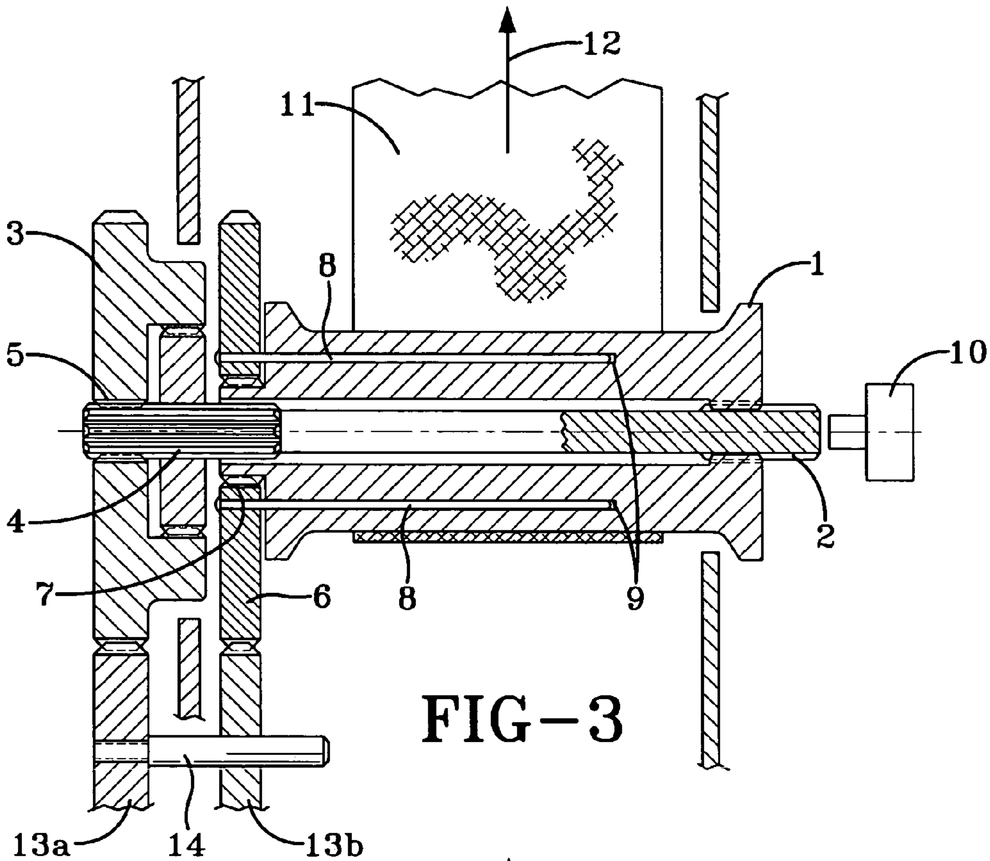
FIG. 3 is a side view of a section taken along the axis of the spool of a second embodiment prior to a crash.
Figure 4:
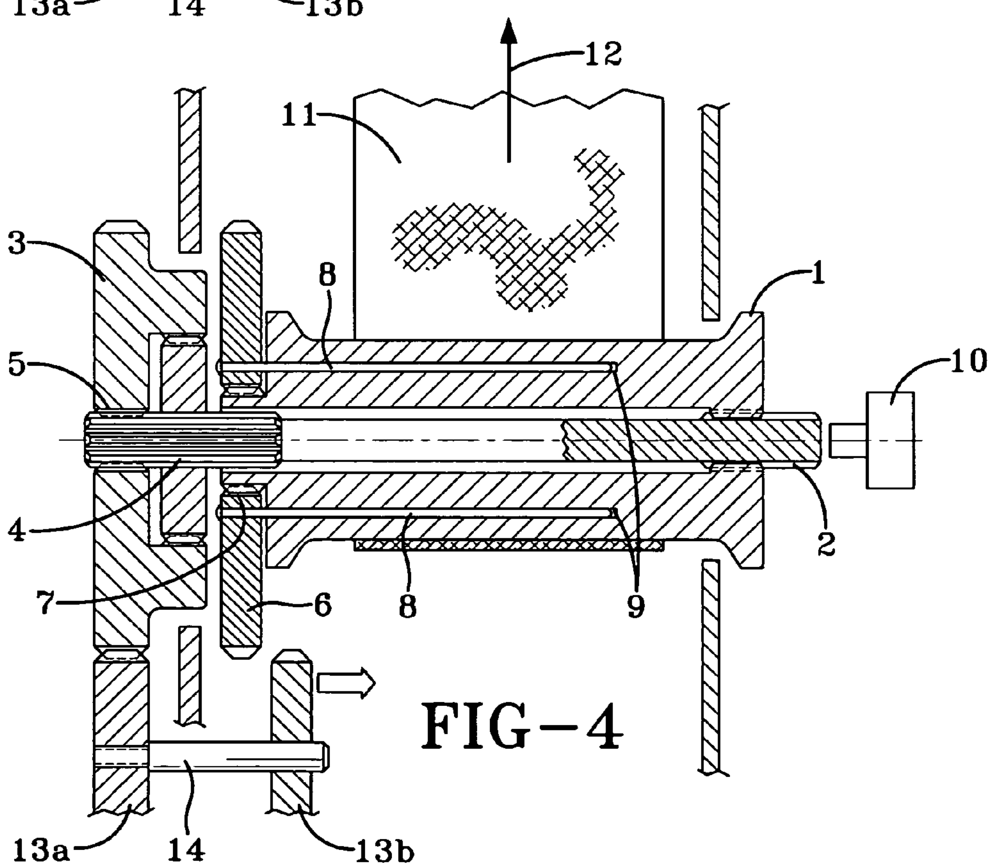
FIG. 4 is a side view of a section taken along the axis of the spool of a second embodiment prior to a crash after disengagement of the wire.

In a second embodiment shown in FIGS. 3 and 4, the locking ring 3 and locking plate 6 are not directly coupled together and the locking plate 6 is mounted so as to be rotatable with the spool 1. Both the locking ring 3 and the locking plate 6 have tooth form actions on their external radial surfaces, which are engaged by lockbars 13*a*, 13*b* respectively during a crash to prevent rotation. In this embodiment the wires 8 are not detachable from the locking plate 6. The locking plate and the locking ring have teeth formations and the wire is stored in a recess in the spool. The wire may be deformed due to rotation of the spool relative to the locking mechanism when connected in the force path between the spool and the locking mechanism.

The lockbars 13*a*, 13*b* are coupled together by a connecting rod 14 such that both the locking plate 6 and the locking ring 3 may be locked simultaneously. In this condition the combined level of load limiting is provided by both the torsion bar 2 and the wires 8 due to rotation of the spool 1 relative to the locking plate 6 and locking ring 3. Under control of the control signal, a pyrotechnic device fires, forcing the lockbar 13*b* out of engagement with the locking plate 6 as shown in FIG. 3 and allowing the locking plate 6 to rotate freely with the spool 1. Since there is no longer any relative rotation between the spool 1 and the locking plate 6, the wires 8 are disconnected from the force path between the spool 1 and the locking ring 3 and load limiting is now provided by the torsion bar 2 only.

The disengagement of the locking plate 6 with the locking ring 3 provides a particularly reliable mode of operation and, whilst the above embodiments employ a pyrotechnic device for this purpose, the same may be achieved by other means such as, for example, a solenoid.

Figure 5:
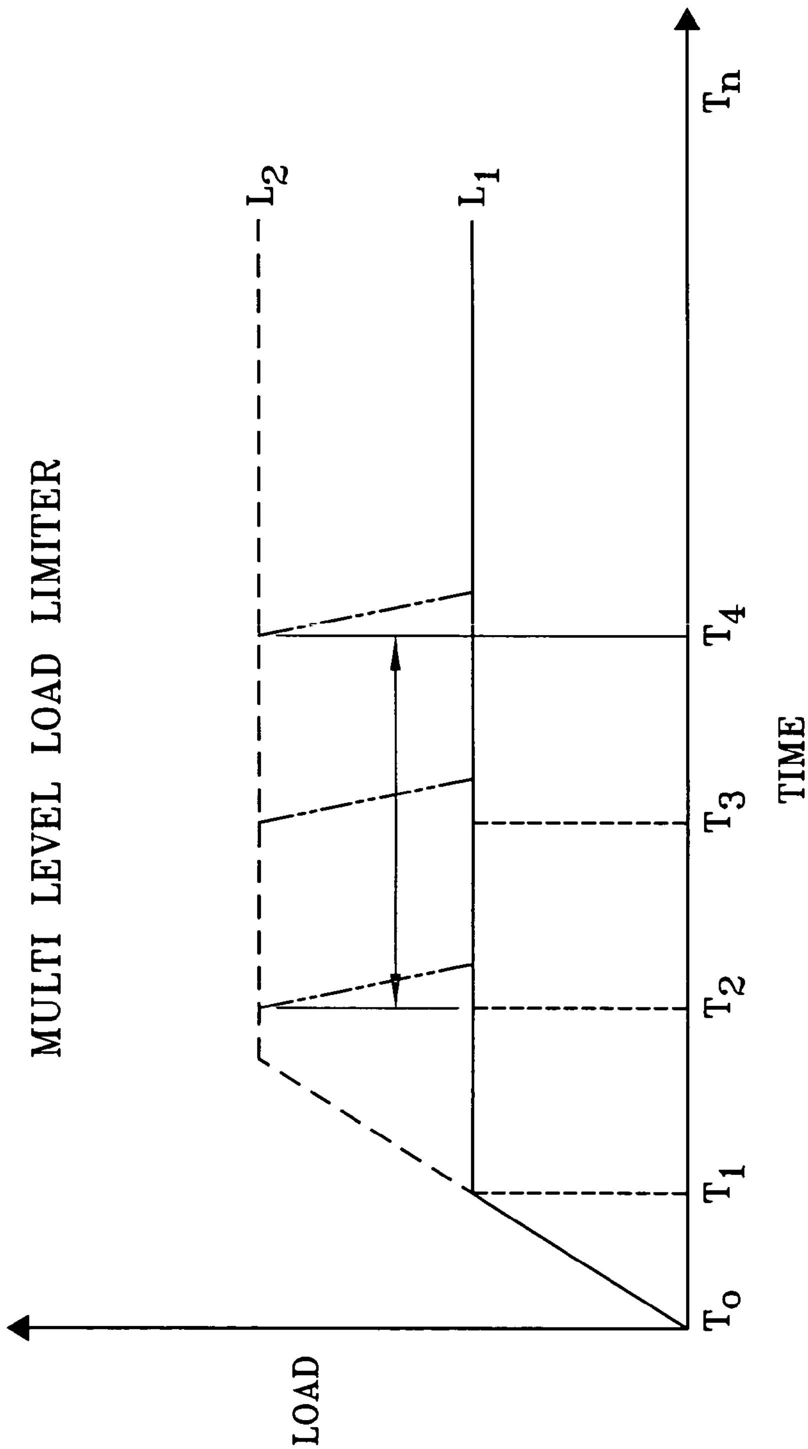
FIG. 5 shows possible force curves provided for by the present invention.

The graph of FIG. 5 shows the load limitation levels available during a crash starting at time $T_0$. The retractor is primed with both the torsion bar 2 and the wires 8 are engaged for load limitation prior to a crash. The locking ring 3 is locked at $T_0$ by the lockbar 13*a*, and the load exerted on the vehicle occupant increases until $T_1$. If a control signal is provided prior to the time $T_1$, the torsion bar 2 alone provides load limiting as shown by line $L_1$. Otherwise the combination of the torsion bar 2 and the wires 8 provide the level of load limiting $L_2$ until point in time ($T_2$, $T_3$, $T_4$), at which the control signal is provided and the wires are disconnected from the force path between the spool 1 and the locking ring 3. The exact point at which the wires are disengaged is dependent upon a predetermined algorithm taking account of any combination of crash severity, crash duration, vehicle occupant size, vehicle occupant weight and vehicle occupant position.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

We claim:

1. A seat belt retractor comprising:

a spool mounted for rotation to allow retraction or pay-out of seat-belt webbing wound thereon depending upon the rotation direction of the spool;

a locking ring connected to the spool for rotation therewith;

a locking plate connected to the spool for rotation therewith;

a lock bar activated by a crash sensor to engage the locking ring to prevent rotation when a crash condition is sensed;

a first and a second force limiting means for controlling pay-out of the seat belt webbing after the locking ring has been locked against rotation;

the first force limiting means comprising resilient means having one end connected to the locking ring and the other end connected to the spool in the force path between the spool and the lock bar;

the second force limiting means comprising a wire having one end located in a recess in the spool and the other end connected to the locking plate;

a means for selectively connecting the locking plate to the lockbar such that when the locking plate is secured against rotation the second force limiting means is activated;

a means for selectively releasing the wire from the force path at a predetermined time during a crash; and wherein the locking plate is selectively disconnected from the locking ring by a means for moving the locking plate in a direction parallel to the axis of the spool.

2. The seat belt retractor according to claim 1, wherein a control signal is supplied in response to a means for sensing at least one value selected from a group of values consisting of: (a) the weight of a vehicle occupant, (b) the size of a vehicle occupant, (C) the position of a vehicle occupant, and (d) the severity of the crash; and the control signal is activated if the sensed at least one value is below a predetermined value.

3. The seat belt retractor according to claim 1, wherein the control signal is supplied in dependence upon whether an airbag is deployed.

4. The seat belt retractor according to claim 1, wherein the means for moving the locking plate comprises a pyrotechnic device or a solenoid.

5. The seat belt retractor according to claim 4, wherein the locking plate and the locking ring have complimentary teeth formations for selectively engaging the locking plate and the locking ring.

6. The seat belt retractor according to claim 1, wherein the locking plate and the locking ring have complimentary teeth formations for selectively engaging the locking plate and the locking ring.

* * * * *